(12) United States Patent
Nakashimo

(10) Patent No.: US 6,614,205 B2
(45) Date of Patent: Sep. 2, 2003

(54) CHARGE/DISCHARGE CONTROL CIRCUIT AND A CHARGING-TYPE POWER-SUPPLY UNIT

(75) Inventor: Takao Nakashimo, Chiba (JP)

(73) Assignee: Seiko Instruments Inc. (JP)

(*) Notice: Subject to any disclaimer, the term of this patent is extended or adjusted under 35 U.S.C. 154(b) by 0 days.

(21) Appl. No.: 10/027,062

(22) Filed: Dec. 26, 2001

(65) Prior Publication Data
US 2002/0109483 A1 Aug. 15, 2002

(30) Foreign Application Priority Data
Feb. 9, 2001 (JP) .................................... 2001-034198

(51) Int. Cl.[7] .................................................. H02J 7/00
(52) U.S. Cl. ..................................................... 320/134
(58) Field of Search ................................ 320/134, 136, 320/157, 158, 159, 162, 163, 164; 429/7, 61, 90, 91; 361/65, 79, 86, 87, 88, 91.1, 91.5, 93.1, 93.7, 93.9, 98, 101, 111

(56) References Cited

U.S. PATENT DOCUMENTS 5,547,775 A * 8/1996 Eguchi et al. ............... 320/118
6,060,185 A * 5/2000 Okutoh ........................ 320/134

* cited by examiner

Primary Examiner—Edward H. Tso
Assistant Examiner—Pia Tibbits
(74) Attorney, Agent, or Firm—Adams & Wilks

(57) ABSTRACT

There is provided a charge/discharge control circuit for preventing a charging current from flowing into a secondary battery through a parasitic diode and a resistor for allowing return from an overcurrent state although a switching circuit is turned off. The present invention employs a configuration in which a connection of a charger is detected and thus the resistor is disconnected from an overcurrent detecting terminal, whereby that a charging current is prevented from flowing through the parasitic diode even when the switching circuit is turned off and the charger is connected.

10 Claims, 2 Drawing Sheets

CHARGE/DISCHARGE CONTROL CIRCUIT AND A CHARGING-TYPE POWER-SUPPLY UNIT

BACKGROUND OF THE INVENTION

1. Field of the Invention

The present invention relates generally to a charge/discharge control circuit for controlling the charge and discharge of a secondary battery and to a rechargeable or charging-type power-supply unit with a secondary battery that includes the charge/discharge control circuit.

2. Related Background Art

A power-supply unit as shown in a circuit block diagram in FIG. 4 is known as a conventional charging-type power-supply unit including a secondary battery. Such a configuration is disclosed in, for instance, Japanese Patent Application Laid-open No. Hei 4-75430 "A Charging-Type Power-Supply Unit". That is, a secondary battery 101 is connected to an external terminal −V0 or +V0 through a switching circuit 102. In addition, a charge/discharge control circuit 110 is connected to the secondary battery 101 in parallel. This charge/discharge control circuit 110 has a function of detecting the Voltage of the secondary battery 101.

When the secondary battery 101 is either in an overcharged state (the state where the battery has a higher voltage than a predetermined voltage: hereinafter referred to as an "overcharge protective state") or in an overdischarged state (the state where the battery has a lower voltage than a predetermined voltage: hereinafter referred to as an "overdischarge protective state"), a signal is outputted from the charge/discharge control circuit 110 so that the switching circuit 102 is turned off. Further, the switching circuit 102 is set to be turned off to stop discharge when the external terminal +V0 reaches a certain voltage, so that a current flowing through the switching circuit 102 can be limited. In other words, discharge can be stopped (overcurrent can be controlled) when an excessive current flows. Hereinafter, this state is referred to as an "overcurrent protective state". The charge/discharge control circuit serves to protect the battery from such states.

It is necessary for this charge/discharge control circuit 110 to output a control signal for turning the switching circuit 102 on when a load 103 is disconnected from between the terminals +V0 and −V0 after the overcurrent protective state is realized.

FIG. 2 is a block diagram showing a charging-type power-supply unit including a conventional charge/discharge control circuit. When the load 103 is connected and the Voltage of an overcurrent detecting terminal exceeds that of a reference Voltage source 122, the charge/discharge control circuit detects overcurrent. When the overcurrent is detected, an overcurrent detecting comparator 120 outputs a high-level Voltage which serves as an overcurrent detecting signal. The output signal from this overcurrent detecting comparator 120 serves as an input signal to an internal control circuit 210. The internal control circuit 210 outputs a signal for turning the switching circuit 102 off. At this time, the internal control circuit 210 outputs a signal to a gate of an N-channel transistor 201 so that the overcurrent detecting terminal can be connected to a VSS terminal on a lower Voltage side of the secondary battery 101 through a resistor 123. Afterward, when the load 103 is disconnected from terminals +V0 and −V0, the voltage of the overcurrent detecting terminal drops to the same electric potential as the voltage of the VSS terminal since the overcurrent detecting terminal is connected to the VSS terminal through the resistor 123. In this case, the output signal from the overcurrent detecting comparator 120 is reversed, and the internal control circuit 210 outputs a signal for turning the switching circuit 102 on to cancel the overcurrent state.

In the case of employing the above-mentioned circuit configuration, however, there has been a problem when a charger 104 is connected, the secondary battery 101 is brought into an overcharged state, and thus the switching circuit 102 is turned off. In the overcharged state, the switching circuit 102 is turned off, so that the charging of the secondary battery 101 is prohibited. In the circuit configuration shown in FIG. 2, however, although the switching circuit 102 is turned off, a parasitic diode 202 is present in the N-channel transistor 201. Therefore, there has been a problem in that a charging current may flow into the secondary battery 101 through the resistor 123 and the parasitic diode 202.

SUMMARY OF THE INVENTION

In order to solve the above problem, in the present invention, it is detected that a charger is connected, and then a resistor is disconnected from an overcurrent detecting terminal, so that a charging current is prevented from flowing into a secondary battery through a parasitic diode even when a switching circuit is turned off and thus the charger is connected.

DETAILED DESCRIPTION OF THE PREFERRED EMBODIMENTS

Figure 1:
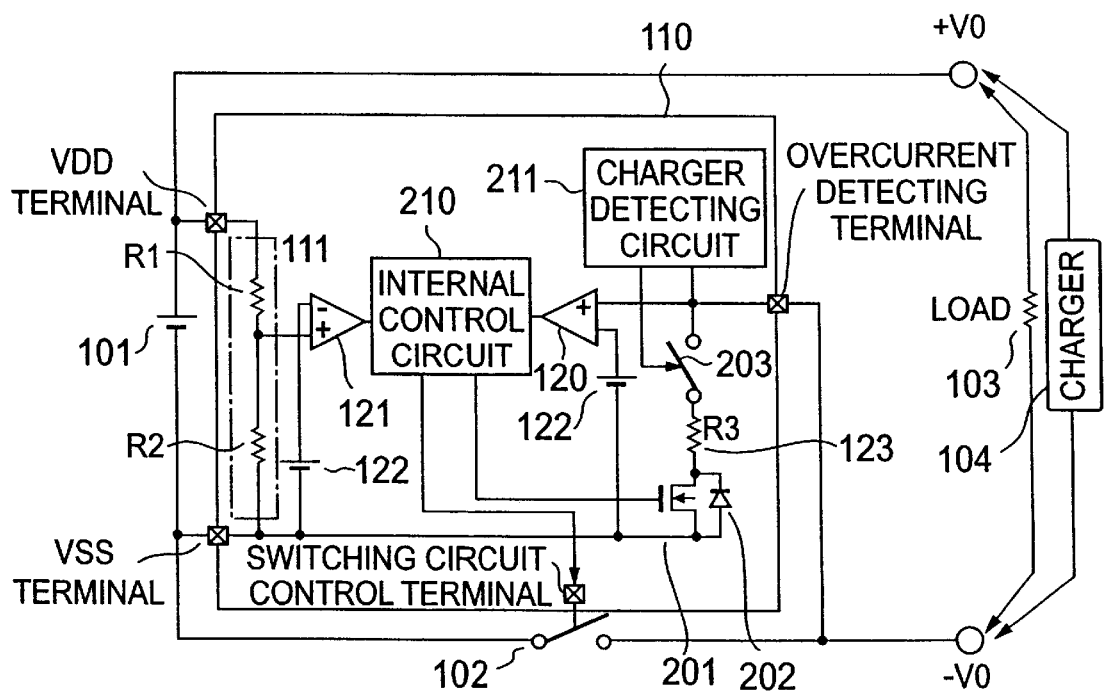
FIG. 1 is an explanatory drawing showing a circuit block of a charging-type power-supply unit according to the present invention.
Figure 2:
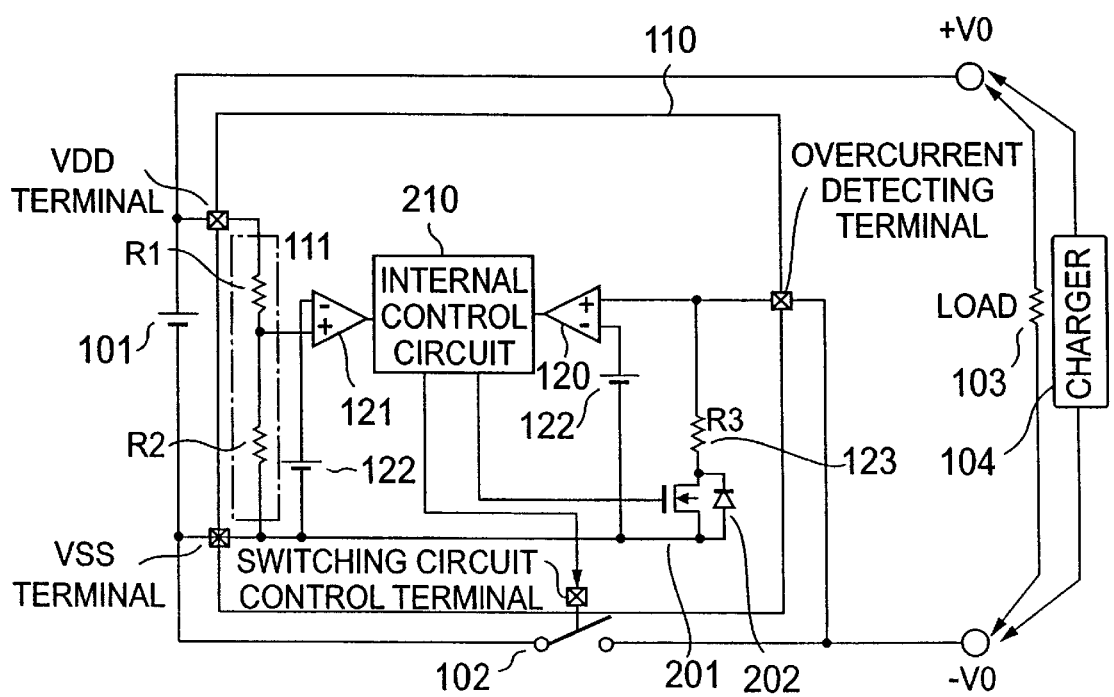
FIG. 2 is an explanatory drawing showing an embodiment of a conventional charging-type power-supply unit.

FIG. 1 is a block diagram showing a charging-type power-supply unit including a charge/discharge control circuit of the present invention. An embodiment of the present invention is described with reference to FIG. 1 as follows. A positive electrode of a secondary battery 101 is connected to an external power terminal +V0. Voltage of the secondary battery 101 is detected by a charge/discharge control circuit 110. According to the detection result, a switching circuit 102 is on-off controlled. The charge/discharge control circuit 110 includes: a reference voltage circuit 122 for applying a predetermined reference voltage Vr to an input terminal of an overcharge detecting comparator 121; a voltage dividing circuit 111 composed of resistors R1 and R2 for dividing a terminal voltage of the secondary battery 101; a reference voltage circuit 122 for applying a predetermined reference voltage Vr to an input terminal of an overcurrent detecting comparator 120; an internal control circuit 210; a charger detecting circuit 211 for detecting a charger; a switching circuit 203 for disconnecting a resistor 123 from the overcurrent detecting terminal according to an output signal from the charger detecting circuit; an N-channel transistor 201 for connecting the resistor 123 to a VSS potential when the overcurrent is detected; and a parasitic diode 202 of the N-channel transistor. The overcurrent detecting terminal is connected between the switching circuit 102 and a charger connecting terminal.

The switching circuit 102 is controlled by the output of the charge/discharge control circuit 110.

The charger 104 for charging the secondary battery 101 and a load 103 to which the secondary battery 101 supplies current are connected between external power terminals +V0 and −V0.

The overcharge detecting comparator 121 has a function of detecting an overcharged state by comparing a divided voltage output that is obtained through division of a terminal voltage of the secondary battery 101 by the resistors R1 and R2 of the voltage dividing circuit 111 with the reference voltage Vr of the reference voltage circuit 122.

The output of the overcharge detecting comparator 121 reaches a high level when the level of the voltage of the divided voltage output inputted to its positive-phase input terminal exceeds the reference voltage Vr.

The overcurrent detecting comparator 120 has a function of detecting voltage by comparing an overcurrent detecting terminal voltage with the reference voltage Vr of the reference voltage circuit 122.

The output of the overcurrent detecting comparator 120 reaches a high level when the level of the overcurrent detecting terminal voltage inputted to its positive-phase input terminal exceeds the reference voltage Vr.

The internal control circuit 210 uses outputs from the overcharge detecting comparator 121 and the overcurrent detecting comparator 120 as input signals to output a signal for controlling the switching circuit 102.

When an overcharged state is reached, the output of the overcharge detecting comparator 121 reaches a high level and thus the internal control circuit 210 outputs a signal for controlling the switching circuit 102.

When detecting a charger, the charger detecting circuit 211 outputs a signal for controlling the switching circuit 203 to disconnect the resistor 123 from the overcurrent detecting terminal.

In the case where this circuit configuration is employed, it is possible to prevent a charging current from flowing into the secondary battery 101 through the resistor 123 and the parasitic diode 202 when the secondary battery 101 is brought into an overcharged state and the switching circuit 102 is turned off to stop charging.

Another embodiment of the present invention is described with reference to FIG. 3.

Figure 3:
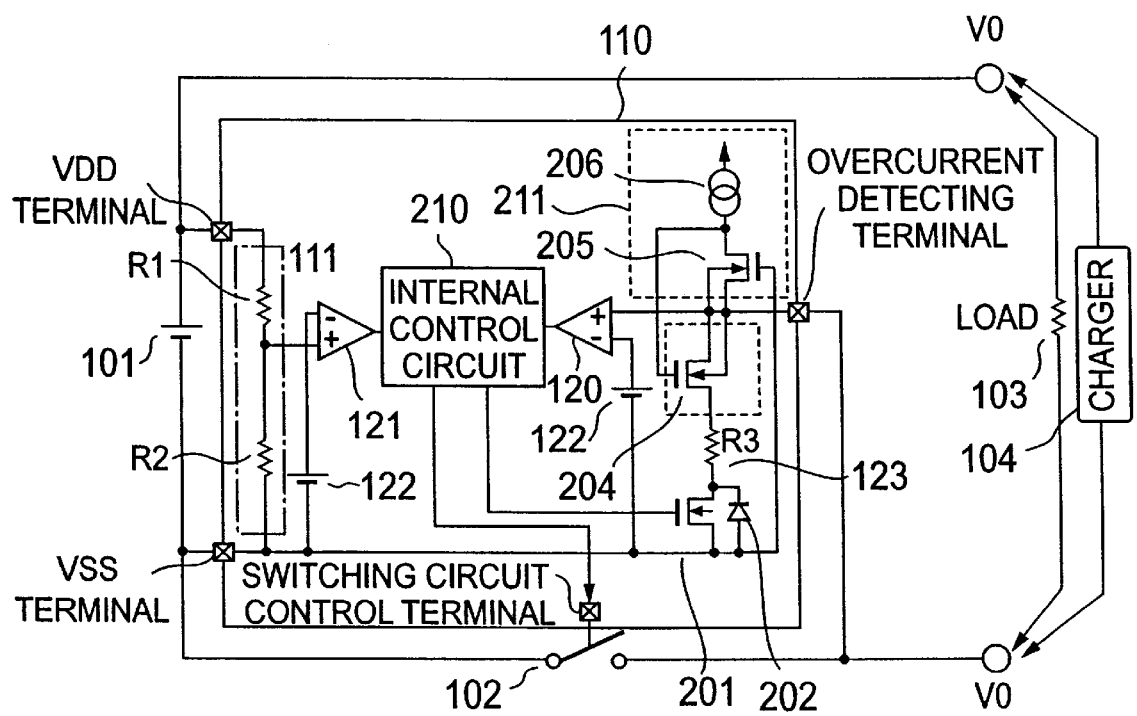
FIG. 3 is an explanatory drawing showing another circuit block of a charging-type power-supply unit according to the present invention.
Figure 4:
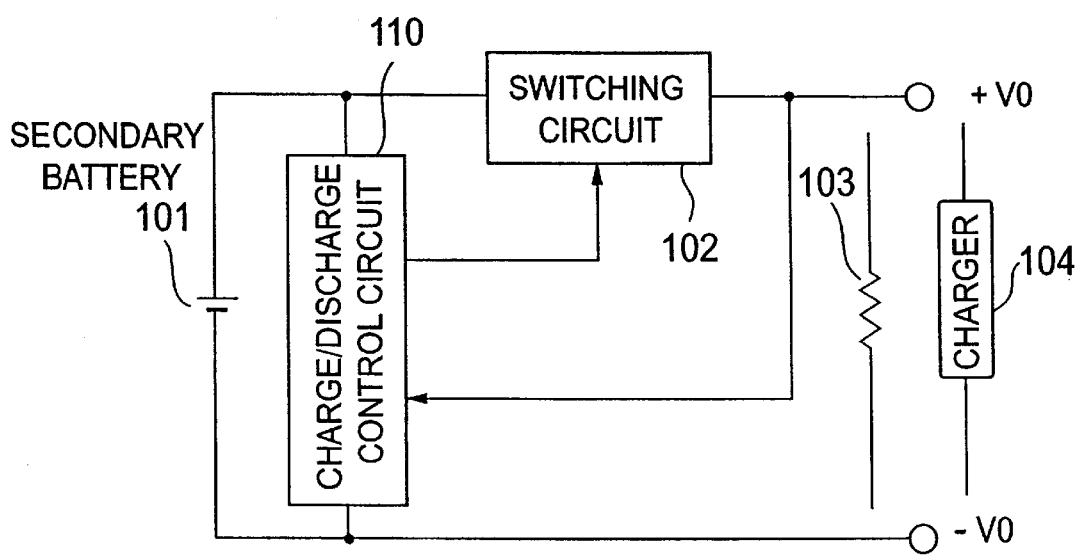
FIG. 4 is an explanatory drawing showing a circuit block of a conventional charging-type power-supply unit.

In the embodiment shown in FIG. 3, a charger detecting circuit 211 is composed of a constant current circuit 206 and an N-channel transistor 205. A switching circuit 203 is realized using an N-channel transistor 204. A gate voltage of the N-channel transistor 204 is connected between the constant current circuit 206 and the N-channel transistor 205. When the voltage of a charger 104 and that of the secondary battery 101 are at the same electric potential, the N-channel transistor 204 is turned on.

When the voltage of the charger 104 is above that of the secondary battery 101 and exceeds a threshold voltage of the N-channel transistor 205, the potential difference between the source voltage and the gate voltage of the N-channel transistor 205 reaches the threshold voltage or a higher voltage and thus the N-channel transistor 205 is turned on. The gate voltage of the N-channel transistor 204 becomes the same voltage as the source voltage of the N-channel transistor 204, and thus the transistor is turned off. As a result, through the disconnection of a resistor 123 from an overcurrent detecting terminal, the charging current can be prevented from flowing into the secondary battery 101 through the resistor 123 and the parasitic diode 202 when the switching circuit 102 is turned off to stop charging.

Apparently, the same configuration also can be achieved using another voltage detecting means as the charger detecting means.

The same configuration also can be achieved when a plurality of secondary batteries is serially-connected.

According to the present invention, when a charge/discharge control circuit of a charging-type power-supply unit detects a charger, the path through which a charging current flows in an internal control circuit is disconnected, whereby it is possible to reliably stop charging without causing damages to other functions.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A charge/discharge control circuit, comprising:
    overcharge voltage detecting means for detecting an overcharged state of a secondary battery;
    overcurrent voltage detecting means for detecting an overcurrent state of the secondary battery;
    an internal control circuit for outputting a signal for controlling charging and discharging of the secondary battery by processing signals output from the overcharge voltage detecting means and the overcurrent voltage detecting means;
    an automatic return resistor for allowing an overcurrent detecting terminal to return to a normal state from an overcurrent state when an overcurrent load is disconnected from the secondary battery;
    a transistor for selectively connecting the automatic return resistor to allow current to pass therethrough; and
    charger detecting means for detecting when a charger is connected to charge the secondary battery and having a switch for disconnecting the automatic return resistor when a charger is connected to the secondary battery so that a charging current cannot flow from the charger to the secondary battery through a parasitic diode in the transistor.

2. A charging-type power-supply unit, comprising:
    a secondary battery connected to an external connection terminal through a switching circuit;
    a charge/discharge control circuit for controlling the switching circuit and comprising at least one of an overcharge voltage detecting circuit for detecting an overcharged state of the secondary battery and an overcurrent detecting circuit for detecting an overcurrent state of the secondary battery, and an internal control circuit for controlling the switching circuit in accordance with an output of the overcharge voltage detecting circuit or the overcurrent detecting circuit;
    a current control switching circuit;
    an automatic return resistor for allowing an overcurrent detecting terminal to return to a normal state from an overcurrent state when an overcurrent load is disconnected from the secondary battery;

a transistor for selectively connecting the automatic return resistor to allow current to pass therethrough; and charger detecting means for detecting when a charger is connected to charge the secondary battery and having a switch for disconnecting the automatic return resistor when a charger is connected to the secondary battery so that a charging current cannot flow from the charger to the secondary battery through a parasitic diode in the transistor.

3. A charge/discharge control circuit according to claim 1; wherein the switch for disconnecting the automatic return resistor comprises a transistor.

4. A charge/discharge control circuit, comprising:

overcharge voltage detecting means for detecting an overcharge state of a secondary battery;

overcurrent voltage detecting means for detecting an overcurrent state of the secondary battery;

an internal control circuit for outputting a signal for controlling charging and discharging of the secondary battery by processing a signal output by the overcharge voltage detecting means or the overcurrent voltage detecting means;

an automatic return resistor for allowing automatic return from an overcurrent state when an overcurrent load is disconnected;

a transistor for selectively connecting the automatic return resistor to allow current to pass therethrough; and charger detecting means comprised of a constant current source and a transistor connected to the constant current source for detecting when a charger is connected to charge the secondary battery and having a switch for disconnecting the automatic return resistor when a charger is connected to the secondary battery.

5. A charge/discharge control circuit according to claim 1; wherein the overcharge voltage detecting means comprises a voltage divider for dividing a terminal voltage of the secondary battery and outputting a divided voltage, and a comparator for comparing the divided voltage with a reference voltage and outputting an overcharge detection signal when the divided voltage is greater than the reference voltage.

6. A charge/discharge control circuit according to claim 1; wherein the overcurrent voltage detecting means comprises a comparator for comparing a voltage at an overcurrent detecting terminal with a reference voltage and outputting an overcurrent detection signal when the voltage at the overcurrent detecting terminal is greater than the reference voltage.

7. A charging-type power-supply unit according to claim 2; wherein the switch for disconnecting the automatic return resistor comprises a transistor.

8. A charging-type power-supply unit according to claim 2; wherein the charger detecting means is comprised of a constant current source and a transistor connected to the constant current source.

9. A charging-type power-supply unit according to claim 2; wherein the overcharge voltage detecting circuit comprises a voltage divider for dividing a terminal voltage of the secondary battery and outputting a divided voltage, and a comparator for comparing the divided voltage with a reference voltage and outputting an overcharge detection signal when the divided voltage is greater than the reference voltage.

10. A charging-type power-supply unit according to claim 2; wherein the overcurrent detecting circuit comprises a comparator for comparing a voltage at an overcurrent detecting terminal with a reference voltage and outputting an overcurrent detection signal when the voltage at the overcurrent detecting terminal is greater than the reference voltage.

* * * * *